United States Patent
Mueller et al.

(10) Patent No.: US 10,974,579 B2
(45) Date of Patent: Apr. 13, 2021

(54) VEHICLE ROOF, COMPRISING A ROLLER BLIND ASSEMBLY HAVING BEARING UNITS FOR A ROLLER BLIND WEB

(71) Applicant: Webasto SE, Stockdorf (DE)

(72) Inventors: Mathias Mueller, Dachau (DE); Guenter Tirpitz, Greifenberg (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/981,829

(22) PCT Filed: Feb. 18, 2019

(86) PCT No.: PCT/EP2019/053959
§ 371 (c)(1),
(2) Date: Sep. 17, 2020

(87) PCT Pub. No.: WO2019/197071
PCT Pub. Date: Oct. 17, 2019

(65) Prior Publication Data
US 2021/0046810 A1  Feb. 18, 2021

(30) Foreign Application Priority Data

Apr. 9, 2018 (DE) .................... 10 2018 108 354.8

(51) Int. Cl.
*B60J 7/00* (2006.01)
*B60J 3/02* (2006.01)
(Continued)

(52) U.S. Cl.
CPC ............ *B60J 7/0015* (2013.01); *B60J 7/067* (2013.01); *B62D 25/06* (2013.01); *E06B 9/42* (2013.01); *B60J 7/00* (2013.01)

(58) Field of Classification Search
CPC .................................. B60J 7/0015; E06B 9/42
(Continued)

(56) References Cited

U.S. PATENT DOCUMENTS

2011/0204682 A1  8/2011 Kamei et al.
2012/0255690 A1  10/2012 Zeo et al.
(Continued)

FOREIGN PATENT DOCUMENTS

DE  102004020337 A1  8/2005
DE  102013211715 A1  12/2013
(Continued)

OTHER PUBLICATIONS

International Search Report for PCT/EP2019/053959 dated Jun. 19, 2019 in English and German (8 pages).
(Continued)

*Primary Examiner* — Dennis H Pedder
(74) *Attorney, Agent, or Firm* — Fitch, Even, Tabin & Flannery, LLP

(57) ABSTRACT

A vehicle roof having at least one transparent section, a roof-attached support section and a roller blind assembly for selectively shading the transparent roof section at least partially. The blind assembly including at least one roller blind unit having a web to be wound up to form a reel and one lateral bearing unit on either side of a vertical longitudinal roof center plane. The reel disposed between two lateral bearing units and the roller blind assembly having a bearing shell on top of which the at least one roller blind unit is fastened via the lateral bearing units which is fixed to the at least one support section from below. Each bearing units has a bearing pedestal fixed to the bearing shell and a roller blind guide element displaceable as against the bearing pedestal in a pre-installation position and fixed to the roof-attached support section in an installation position.

24 Claims, 15 Drawing Sheets

(51) Int. Cl.
  *E06B 9/42* (2006.01)
  *B60J 7/06* (2006.01)
  *B62D 25/06* (2006.01)

(58) Field of Classification Search
  USPC .......................................................... 296/214
  See application file for complete search history.

(56) References Cited

U.S. PATENT DOCUMENTS

| | | |
|---|---|---|
| 2013/0341972 A1 | 12/2013 | Choi et al. |
| 2017/0087966 A1 | 3/2017 | Umeki et al. |
| 2018/0162207 A1 | 6/2018 | Pike et al. |
| 2019/0176580 A1 | 6/2019 | Steiner |
| 2019/0344645 A1 | 11/2019 | Mueller et al. |

FOREIGN PATENT DOCUMENTS

| | | |
|---|---|---|
| DE | 102014005476 A1 | 10/2015 |
| DE | 102015109862 A1 | 12/2016 |
| DE | 102016111695 A1 | 12/2017 |
| DE | 102016125284 A1 | 6/2018 |
| EP | 0237759 A2 | 9/1987 |
| EP | 2327576 A1 | 6/2011 |
| JP | S62171313 U | 10/1987 |
| JP | H04348920 A | 12/1992 |
| WO | 2013034630 A1 | 3/2013 |

OTHER PUBLICATIONS

Written Opinion of the ISA for PCT/EP2019/053959 dated Jun. 19, 2019 in German with English machine translation (9 pages).
English translation of the International Preliminary Report on Patentability for PCT/EP2019/053959 dated Oct. 22, 2020 (7 pages).

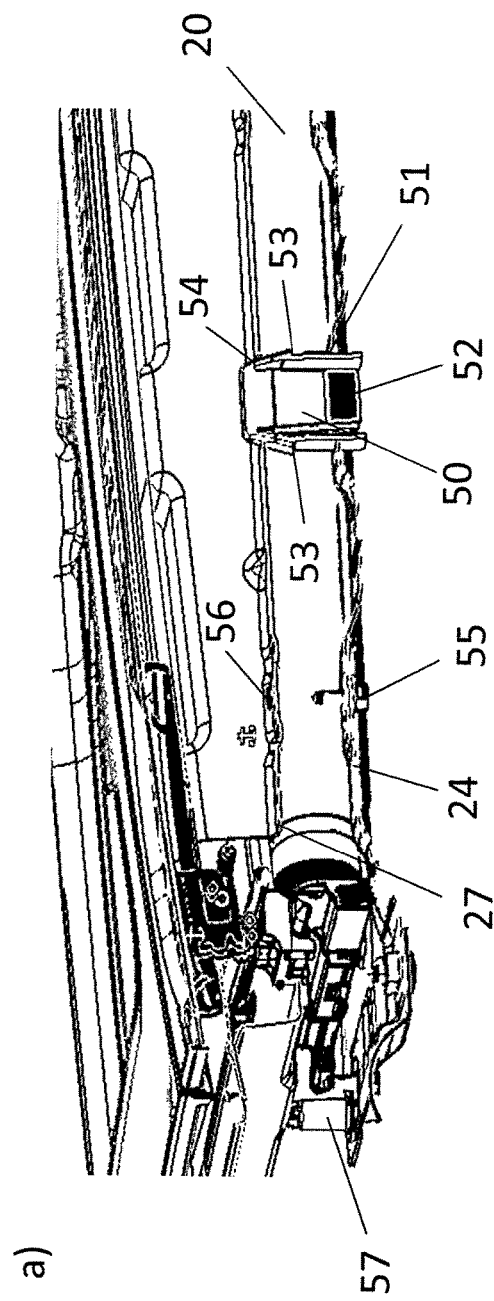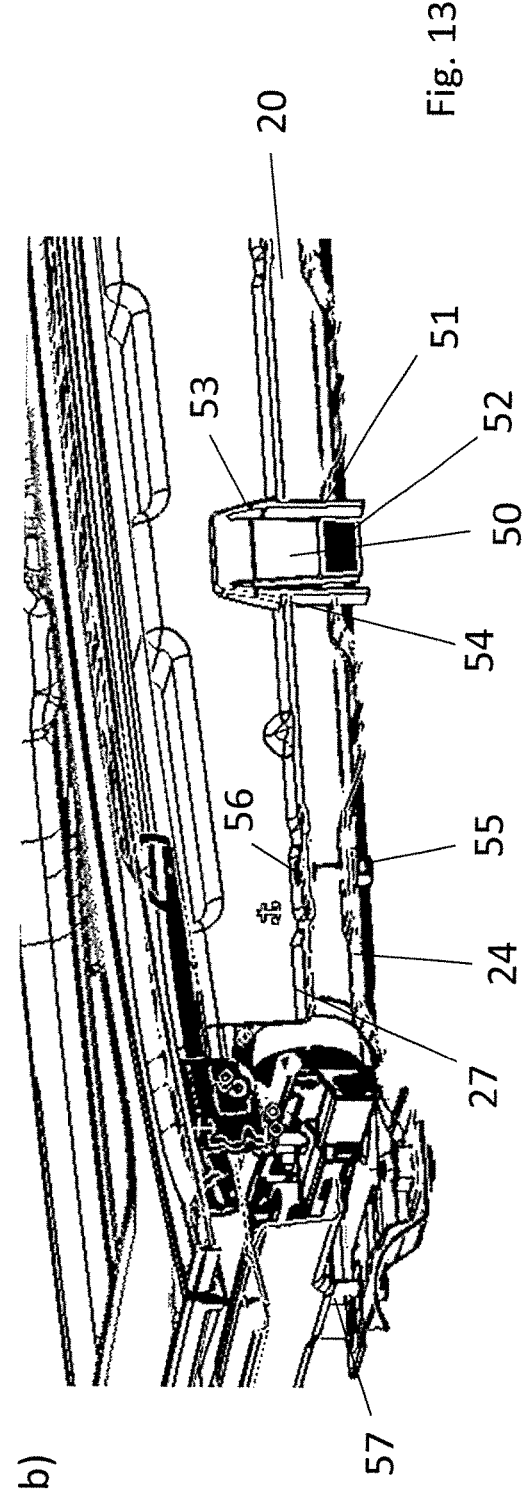
Fig. 13

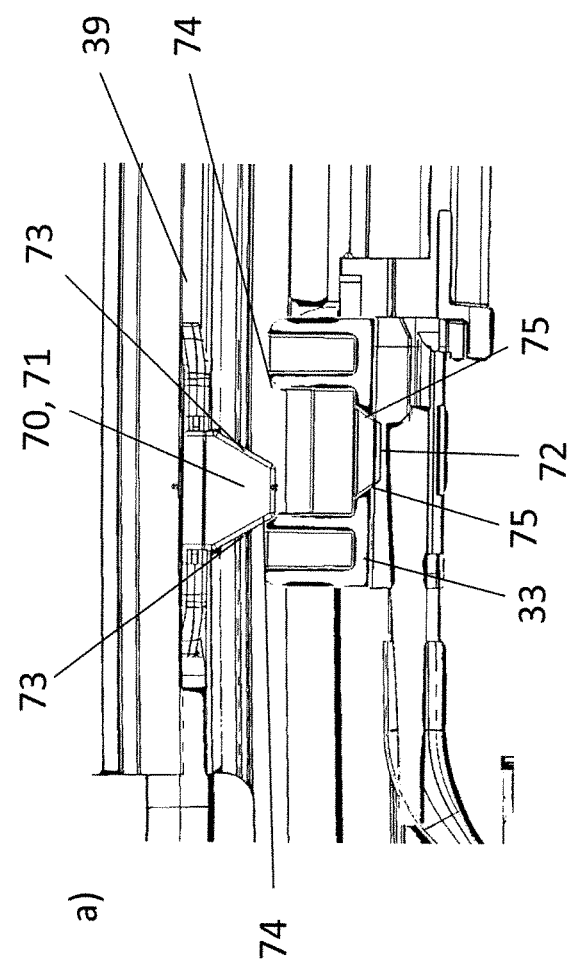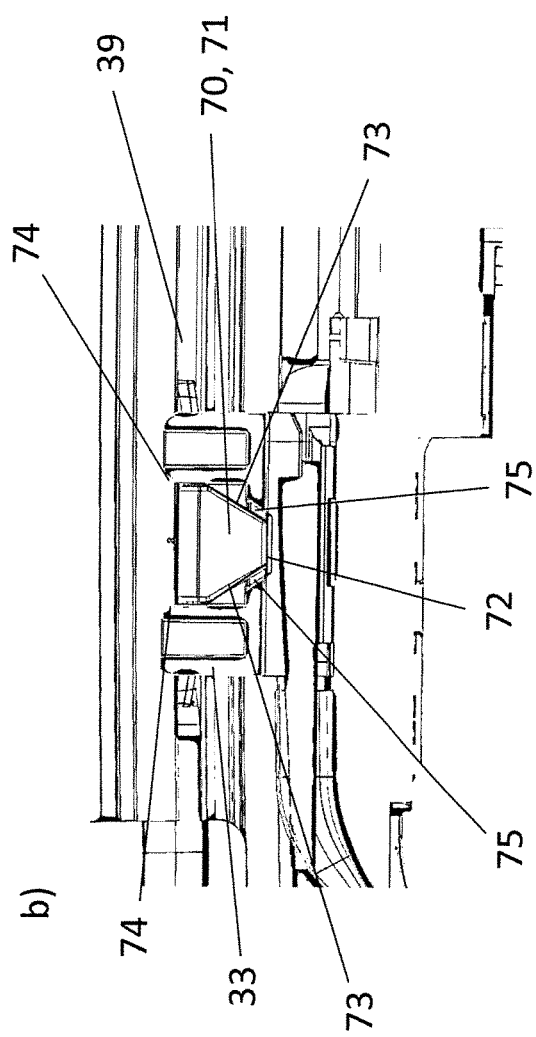
Fig. 15

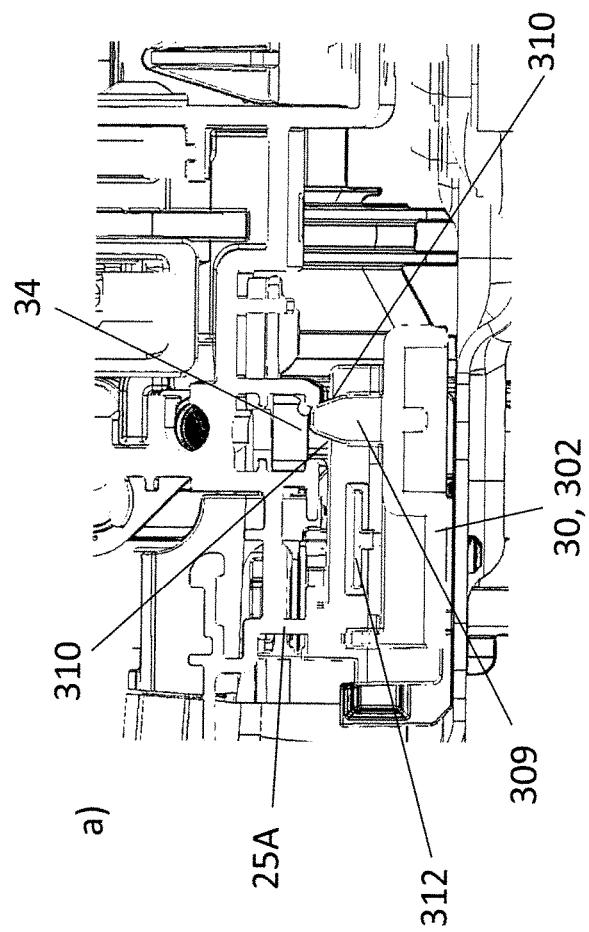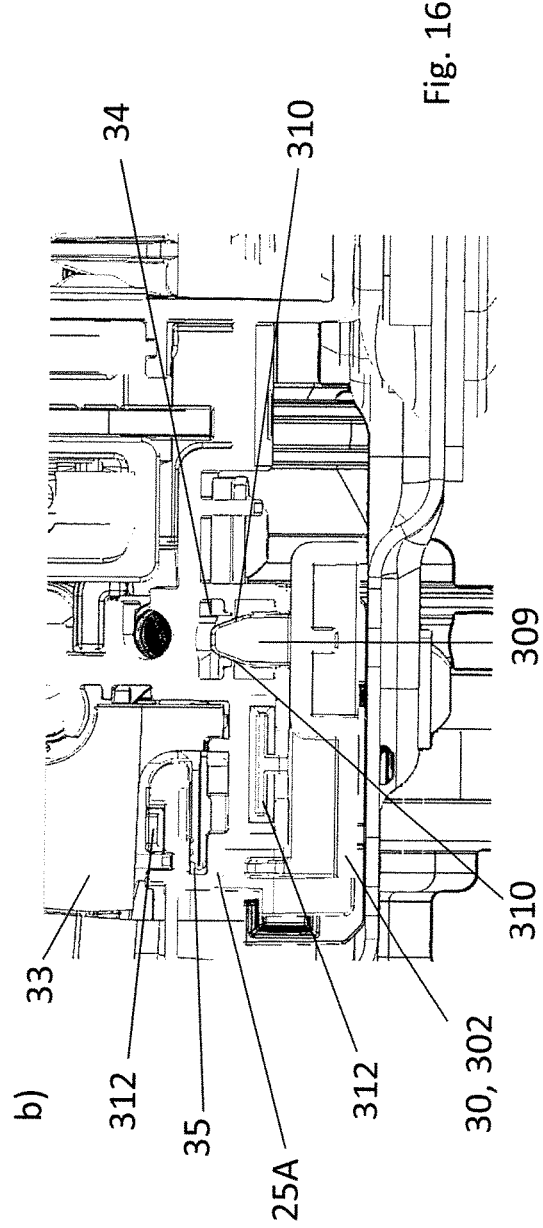
Fig. 16

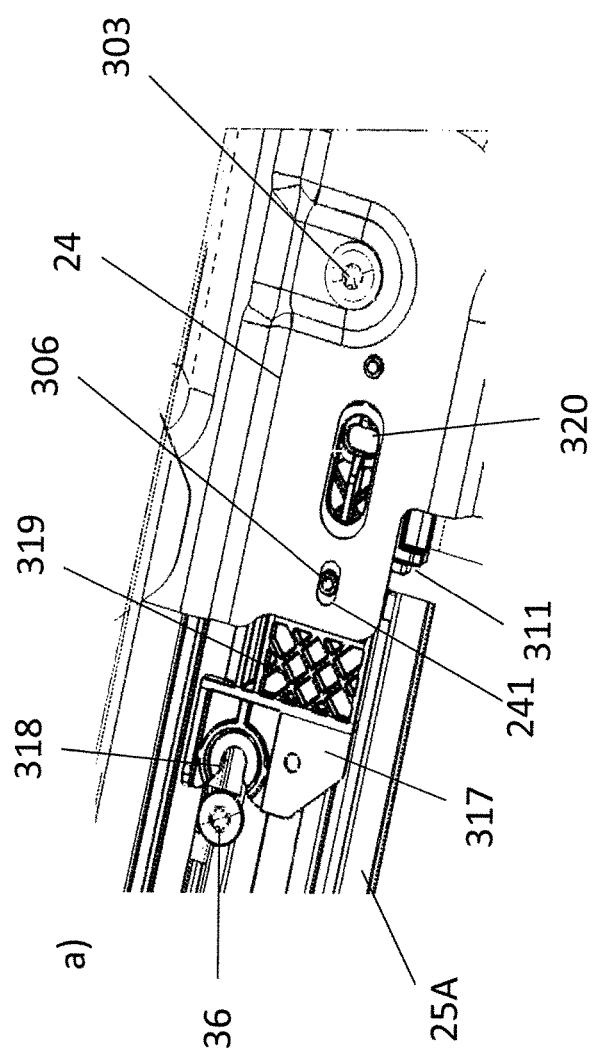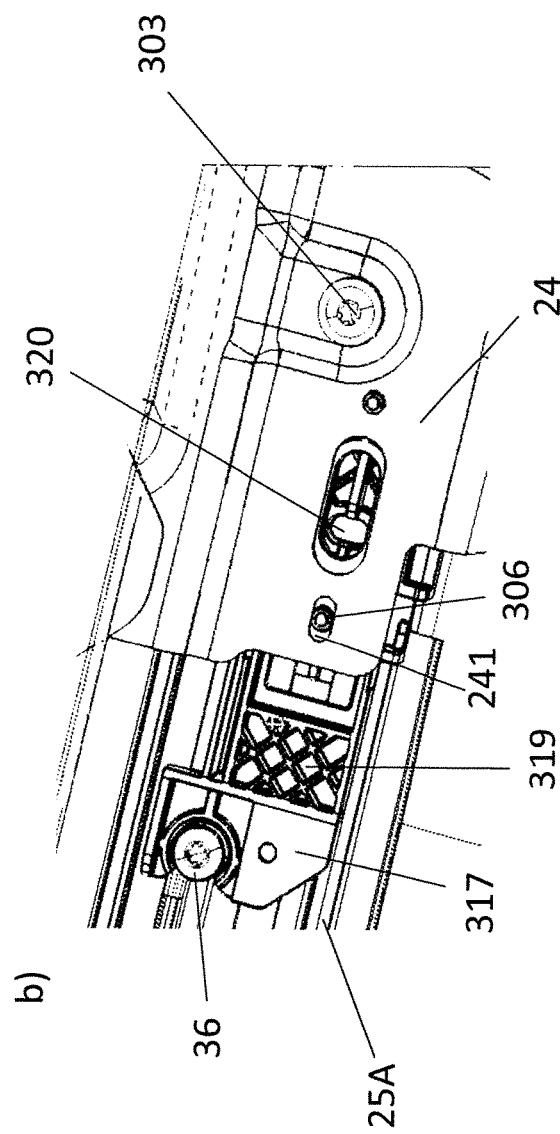
Fig. 17

VEHICLE ROOF, COMPRISING A ROLLER BLIND ASSEMBLY HAVING BEARING UNITS FOR A ROLLER BLIND WEB

CROSS-REFERENCE TO RELATED APPLICATIONS

This application is a U.S. national phase application filed under 35 U.S.C. § 371 of International Application No. PCT/EP2019/053959, filed 18 Feb. 2019, designating the United States, which claims priority from German Patent Application No. 10 2018 108 354.8, filed 9 Apr. 2018, which are hereby incorporated herein by reference in their entirety for all purposes.

FIELD

The invention relates to a vehicle roof having the features of the preamble of claim 1.

BACKGROUND

A vehicle roof of this kind is known from document DE 10 2014 005 476 A1. Said vehicle roof comprises a roller blind assembly for shading a transparent roof section, said roller blind assembly including a bearing unit on each of its two sides, said bearing units being fixed to a roof frame from above which forms a bearing shell for the roller blind unit. The roof frame, in turn, is fixed to a roof-attached support section of the vehicle in question. The roof frame is installed at the vehicle in question or at the vehicle roof in question together with the roller blind assembly. The roller blind assembly thus has to be pre-installed in its entirety before the roof frame is connected to a body shell of a vehicle. Since the installation space would then no longer be accessible, the roller blind assembly cannot be mounted after installation of the roof on the body shell.

SUMMARY

The object of the invention is to provide a vehicle roof of the kind mentioned above in which the roller blind assembly can also be mounted later, i.e. after the support section has been connected to a body shell, from below, and in which the bearing units can then be positioned in relation to the roof-attached support section in a simple manner.

In accordance with the invention, this object is attained by the vehicle roof having the features of claim 1.

The vehicle roof according to the invention comprises lateral bearing units for the roller blind assembly or the roller blind reel which are split in two parts and comprise a bearing pedestal which is fixedly connected to the bearing shell and a roller blind guide element which is movable as against the bearing pedestal, i.e. mounted at the latter in a floating fashion, before it is fixed to the roof-attached support section in a positionally accurate fashion. The roller blind unit is fastened on the bearing shell via the lateral bearing units. The bearing shell can be fixed to the roof-attached support section from below. The bearing shell, which can be realized as a so-called roller blind trough, constitutes a mounting platform which can be connected to the vehicle roof in the manner of a module even if the vehicle roof has already been fixed to the body shell. Thus, the roller blind assembly can be installed belatedly and automatedly in a modularized manner. This, in turn, allows the roller blind assembly to be tailored to the customer's wishes, such as in terms of the color of the roller blind web, at a later point. Additionally, the roller blind assembly can be moved toward the vehicle roof from below in an area of the vehicle roof which is located next to the transparent roof section. Thus, the roller blind assembly does not cover the maximum available see-through portion of the roof. The bearing pedestals of the bearing units via which the roller blind unit is placed on the bearing shell in particular serve to mount the roller blind reel. The roller blind unit is coupled to the support section or to roof-attached guide rails, which can be a part of the roof-attached support section, via the roller blind guide elements of the bearing units.

In the present case, the installation position is to be understood to be the position of the roller blind guide element which corresponds to the state in which the roller blind guide element is completely mounted at the roof. The pre-installation position is the position of the roller blind guide element which it assumes in a step for fastening the bearing shell, for example.

The bearing units or the individual parts of the bearing units can each be formed as an injection-molded plastic part. The bearing shell, which preferably extends in the horizontal direction of the roof and can be a stamped or a bent part made from sheet metal, it in particular realized in one piece.

In a preferred embodiment of the vehicle roof according to the invention, the roller blind guide elements in each instance protrude beyond an edge of the bearing shell in the direction in which the roller blind web is extended. Thus, the roller blind guide elements can be moved as against the bearing pedestals before being fixed to the roof-attached support section when the bearing shell has already been fixed to the roof-attached support section since machine operators can reach them from below.

For fixing the roller blind guide elements to the roof-attached support section, each of them is preferably provided with a screw hole which is open at a side disposed in the direction in which the roller blind web is extended and via which the respective roller blind guide element is screwed to the roof-attached support section. When the bearing shell is fixed, the roller blind guide element can thus be moved as against the bearing pedestal in question in such a way that the screw hole is pushed over a pre-installed screw in the manner of a fork, the roller blind guide element then being fixed to the roof-attached support section via said screw.

In order to make it easier to displace the roller blind guide elements as against the bearing pedestals, each of the roller blind guide elements includes a grasping recess at its underside.

The roller blind assembly of the vehicle roof according to the invention is preferably a laterally guided roller blind. In a preferred embodiment, each of the roller blind guide elements therefore includes a centering track in which a lateral guide tape of the roller blind web is guided and which is aligned with a channel of a guide rail profile which is part of the roof-attached support section. Thus, the roller blind guide elements are realized as continuations of the guide rail profiles at least in the broadest sense.

The roller blind web of the roller blind assembly is normally provided with a pull bar which includes a pull bar slider at each of its two lateral ends. Each of the roller blind guide elements therefore preferably also includes a guide track for a pull bar slider, said guide track being aligned with a guide channel of a guide rail profile which is part of the support section. Said guide track can comprise the guide track in which a lateral guide tape of the roller blind web is guided.

In order to retain the pull bar sliders in a way secured against falling off in a pre-installation state, i.e. when mounting the roller blind assembly or its bearing shell at the roof-attached support section, each of the roller blind guide elements preferably includes a catch or catch recess which secures the pull bar slider in question in a pre-installation state at the respective roller blind guide element and which cooperates with a catch counter piece of the respective pull bar slider.

In order to be able to compensate for tolerances in multiple directions in space, each of the roller blind guide elements, in a special embodiment of the vehicle roof according to the invention, is mounted in a floating fashion in the respective bearing pedestal with play in at least two directions in space. For example, the roller blind guide elements can be pulled out of the bearing pedestals in the direction in which the roller blind web is extended before being fixed to the roof-attached support section and can be shifted in the horizontal direction of the roof.

When transporting the roller blind assembly, i.e. before the roller blind assembly is mounted at the roof-attached support section, it is expedient that all elements of the roller blind assembly are retained in a way secured against falling off. For this reason, in a special embodiment of the vehicle roof according to the invention, a catch means is provided for each of the roller blind guide elements which secures them at the respective bearing pedestal in a pre-installation state. The catch means can comprise catches and/or catch recesses.

When mounting the roller blind assembly at the support section, it is advantageous if the most precise pre-positioning which is possible of the roller blind guide elements as against the support section is already achieved when moving the roller blind assembly up to the support section. This is for example realized in that each of the roller blind guide elements includes a positioning projection which engages into a corresponding holding fixture of the support section from below and which is in particular realized as a centering rib which extends in the direction in which the roller blind web is extended.

The positioning projection can additionally be provided with at least one lead-in chamfer which prevents the roller blind guide element from getting jammed when it is being driven into the support section.

Additionally, it is advantageous if each of the roller blind guide elements comprises at least one centering pin disposed at the face side and engaging into a roof-attached centering clearance. With the help of the centering pin, a precise mounting position of the roller blind guide element in question in relation to the roof-attached support section in the vertical direction of the roof and/or horizontal direction of the roof can be achieved. The centering clearance is in particular formed by a channel of a guide rail profile against which a face side of the roller blind guide element in question rests when in an installation position. The face side forms a stop for the roller blind guide element which guarantees an exact positioning of the roller blind guide element in question or the roller blind unit in the direction in which the roller blind web is extended.

In order to be able to drive the pull bar sliders via a drive motor, each of the former preferably includes a holding fixture for a coupling element of a respective drive cable which is driven by a drive motor.

In order to achieve an automatic coupling between the pull bar sliders and the drive cables during the installation of the roller blind assembly from below and with drive cables pre-installed at the roof-attached support section, the holding fixtures of the pull bar sliders are preferably open to the top, accommodating the coupling elements at least in the longitudinal direction of the guide rail profile in question without play.

Coupling between the coupling elements and the pull bar sliders is facilitated if the holding fixtures and/or the coupling elements each have lead-in chamfers.

In a special embodiment of the vehicle roof according to the invention, each of the coupling elements of the drive cables is realized so as to be clamp-shaped and is provided with a tongue which is oriented so as to be parallel to the vertical longitudinal center plane of the roof.

The bearing units preferably do not only serve to center the fabric, i.e. to center the roller blind web in the horizontal direction of the roof, but also to mount the roller blind reel. In particular, each of the bearing pedestals of the bearing units can comprise a bearing pin for a winding tube, for example for a winding shaft which is pretensioned with the aid of a winding spring. The roller blind unit can, however, also be realized without a winding tube, each of the lateral guide tapes then preferably being realized as a constant force spring and causing the roller blind web to be wound up outside of the guide rails.

For facilitating installation of the roller blind assembly at the roof-attached support section, the bearing shell is preferably provided with at least one installation clip which retains said bearing shell at the support section in a pre-installation position and which preferably has an at least nearly rectangular cross-section. The bearing shell can be suspended from the support section in a simple manner via the installation. Then, the bearing shell can be secured at the roof-attached support section via screws or other fixing means and be pulled closer to the roof-attached support section. When the roller blind assembly is installed at the support section manually, the installation clip makes it possible for workmen to move their hands freely.

The installation clip, which prevents the roller blind assembly from being skewed as against the support section in the pre-installation position through its rectangular shape in particular, is preferably a separate component part which is locked in a clearance of the bearing shell with the aid of first catch tabs. Before the roller blind assembly is installed at the support section, the bearing shell is provided with the at least one installation clip.

In a special embodiment of the vehicle roof according to the invention, the installation clip is realized in such a way that, in the pre-installation position, it is locked in an installation clearance of the support section from below with play in the vertical direction of the roof with the aid of two catch tabs. The distance between the bearing shell and the support section in the pre-installation position is preferably selected to be dimensioned in such a way that fixing screws, with which the bearing shell is provided, engage into screw threads in such a way that an actuation of the fixing screws leads to the fixing screws engaging directly into screw threads, pulling the bearing shell against the roof-attached support section in this way. The distance between the support section and the bearing shell in the pre-installation position corresponds to the play in the vertical direction of the roof which is predetermined by the installation clip.

In order to facilitate a positionally accurate installation of the bearing shell or of the roller blind assembly at the roof-attached support section, the bearing shell, in a preferred embodiment of the vehicle roof according to the invention, includes at least one centering dowel, preferably at least one centering dowel on either side of a vertical longitudinal center plane of the roof, which engages into a corresponding centering clearance of the roof-attached support section from below, positioning the roller blind assembly at the support section during the installation in this way.

In order to increase the stiffness of the vehicle in question in the roof area, the bearing shell can be provided with a fixing plate on either side of the vertical longitudinal center plane of the roof, being fixable to the body via said fixing plate. For example, the fixing plates are connected to B-pillars of the vehicle in question in the installed state. The fixing plates constitute so-called crash plates.

The support section, to which the roller blind assembly or the bearing shell of the roller blind assembly is fastened in the installation position, can be formed by a frame of a roof opening system. The frame can include guide rails or guide rail profiles at which the roller blind web of the roller blind assembly is guided via lateral guide tapes.

The bearing shell of the roller blind assembly can form a running edge for the roller blind web, predetermining a curvature of an extended area of the roller blind web in this way.

In a vehicle roof having two transparent roof sections, the roller blind assembly can comprise two roller blind units which are disposed on the bearing shell and can be extended in opposite directions.

Subject-matter of the invention is also a vehicle roof which comprises at least one transparent roof section, a roof-attached support section and a roller blind assembly for selectively shading or clearing the transparent roof section at least partially, said roller blind assembly including at least one roller blind unit which comprises a roller blind web which can be wound up to form a roller blind reel and one lateral bearing unit on either side of a vertical longitudinal center plane of the roof. Said roller blind reel is disposed between the two lateral bearing units. Said roller blind assembly comprises a bearing shell on top of which the at least one roller blind unit is fastened via the lateral bearing units and which is fixed to the at least one support section from below. The bearing shell, which in particular extends in the horizontal direction of the roof and is realized in one piece, is provided with at least one installation clip which retains said bearing shell at the support section in a pre-installation position and which preferably has an angular cross section, in particular an at least nearly rectangular cross section.

It shall be understood that this vehicle roof, which is provided with a roller blind assembly which is easy to install and can be installed from below, can have all the above-described features separately or combined arbitrarily.

Other advantages and advantageous configurations of the subject-matter of the invention can be taken from the description, the drawing and the claims.

BRIEF DESCRIPTIONS OF THE DRAWINGS

An exemplary embodiment of a vehicle roof according to the invention is illustrated in a schematically simplified way in the drawing and will be explained in more detail in the following description.

Figure 18:
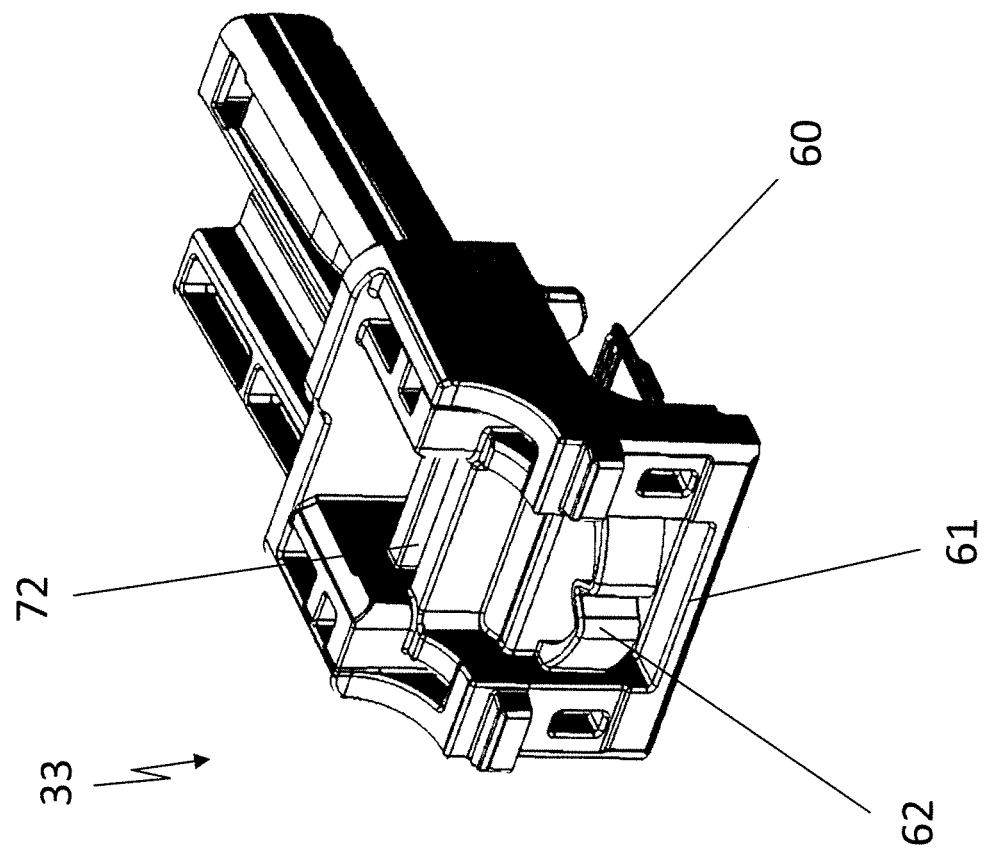

FIG. 13a, b show a pre-installation of the roller blind assembly at a roof-attached support section;

FIG. 14a, b show a coupling of a drive cable having a pull bar slider and pertaining to the roller blind assembly during the installation of the roller blind assembly;

FIG. 15a, b show the coupling in accordance with FIG. 14a, b in a longitudinal section through the roller blind assembly;

FIG. 16a, b show a positioning of one of the bearing units of the roller blind assembly relative to a guide rail during the installation of the roller blind assembly;

FIG. 17a, b show a roller blind guide section of the bearing units being fixed to a guide rail; and FIG. 18 shows a perspective side view of a pull bar slider of the roller blind assembly.

DETAILED DESCRIPTION

The drawing illustrates a vehicle roof 10 which is a panoramic roof of a passenger vehicle and which has a front transparent roof section 11 and a rear transparent roof section 12. Front transparent roof section 11 is formed by a displaceable lid element of a sunroof system. Transparent roof sections 11 and 12 are framed by an opaque solid roof section 13 and separated from each other by another opaque solid roof section 14 extending in the transverse direction of the vehicle.

For selectively shading or at least partially clearing transparent roof sections 11 and 12, vehicle roof 10 has a roller blind assembly 15 which comprises two roller blind units 16 and 17, of which roller blind unit 16 serves to shade front transparent roof section 11 and roller blind unit 17 serves to shade rear transparent roof section 12. Therefor, roller blind unit 16 has a roller blind web 18 and roller blind unit 17 has a roller blind web 19. Roller blind webs 18 and 19 are each formed by an opaque fabric which is capable of being wound and can be wound up into a roller blind reel 20 and 21, respectively, in the area disposed below solid roof section 14 and extending in the horizontal direction of the roof. To actuate roller blind webs 18 and 19, i.e. to extend them or wind them up, roller blind units 16 and 17 each have a pull bar 22 and 23, respectively, which is disposed at the edge facing away from roller blind reel 20 and 21, respectively, on the respective roller blind web 18 and 19, respectively.

In the case at hand, roller blind units 16 and 17 are of identical design, which is why the following description will substantially be based on roller blind unit 16 only, which is assigned to front transparent roof section 11.

Roller blind assembly 15 comprises a bearing shell 24 which is joined to a roof frame 27 from below, said roof frame constituting a roof-attached support section and comprising a pair of front guide rails or guide rail profiles 25A and 25B, which are disposed along lateral edges of the front transparent roof section 11, and a pair of rear guide rails or guide rail profiles 26A and 26B, which are disposed along lateral edges of the rear transparent roof section 12. Bearing shell 24 forms a support plate or a roller blind trough for roller blind units 16 and 17 and extends below solid roof section 14 in the horizontal direction of the roof. Additionally, bearing shell 24 is provided with a fixing plate 28A and 28B, respectively, at its edges disposed on either side of the vertical longitudinal center plane of the roof and said fixing plates can each be screwed to a respective B-pillar of the vehicle body in question. Furthermore, bearing shell 24 forms running edges for roller blind webs 18 and 19 at its edges extending in the horizontal direction of the roof.

Roller blind units 16 and 17 each comprise bearing units 30 which are mirror-symmetrical to each other with respect to the vertical longitudinal center plane of the roof and via which roller blind units 16 or 17 are on the one hand installed on bearing shells 24 and, on the other hand, are joined to the respective guide rails 25A and 25B and 26A and 26B, respectively. Additionally, roller blind units 16 and 17 each have a winding shaft (not shown) which is mounted rotatably between respective bearing units 30 and which has a winding tube pre-loaded in the respective winding direction of respective roller blind webs 18 and 19, respectively, by a winding spring (not shown). For mounting the winding shaft, bearing units 30 each have a bearing pin 32 which is realized at the inner side of respective bearing unit 30 facing respective roller blind reel 20 and 21, respectively.

Figure 1:
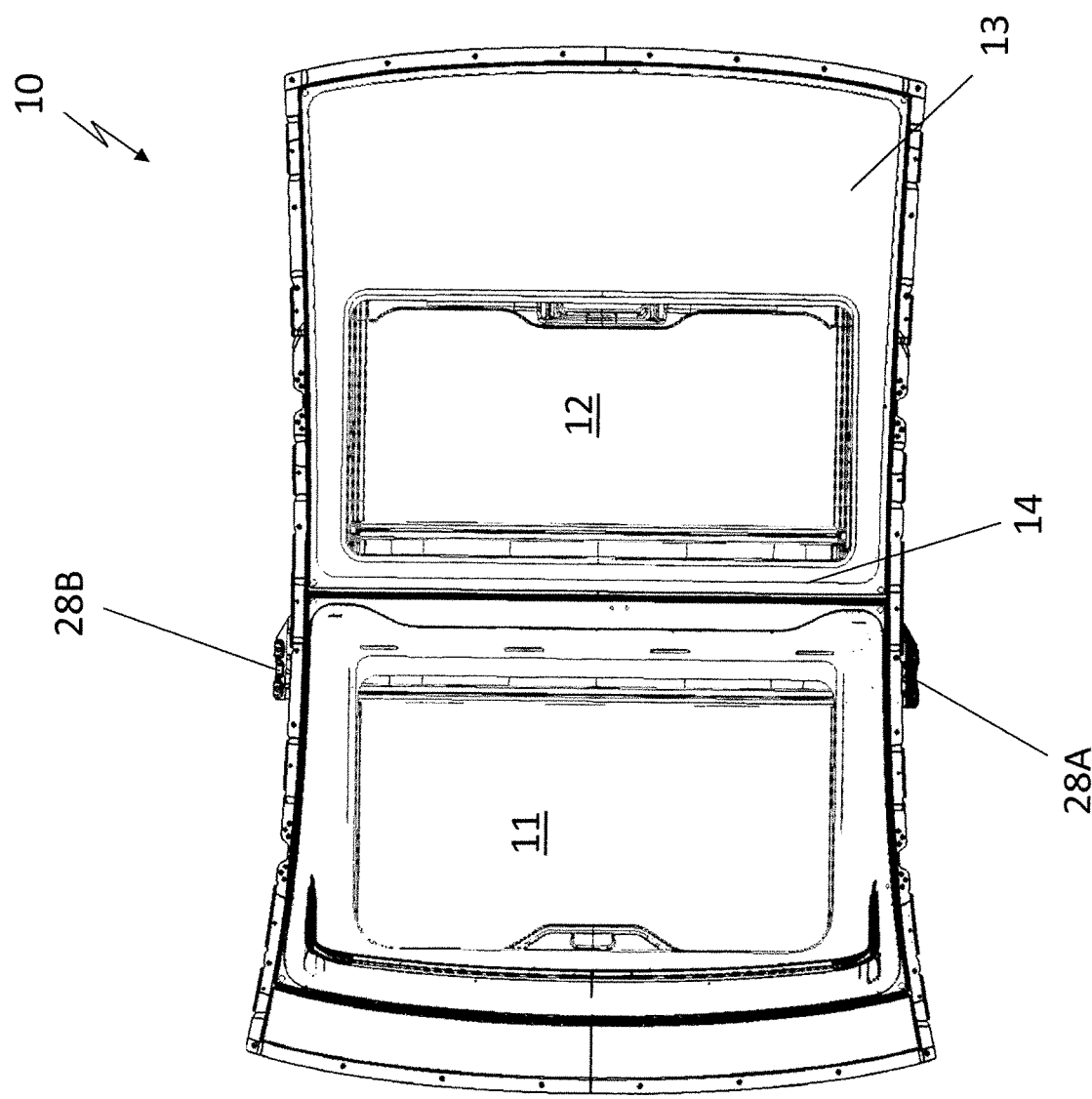
FIG. 1 shows a top view onto a vehicle roof according to the invention.
Figure 2:
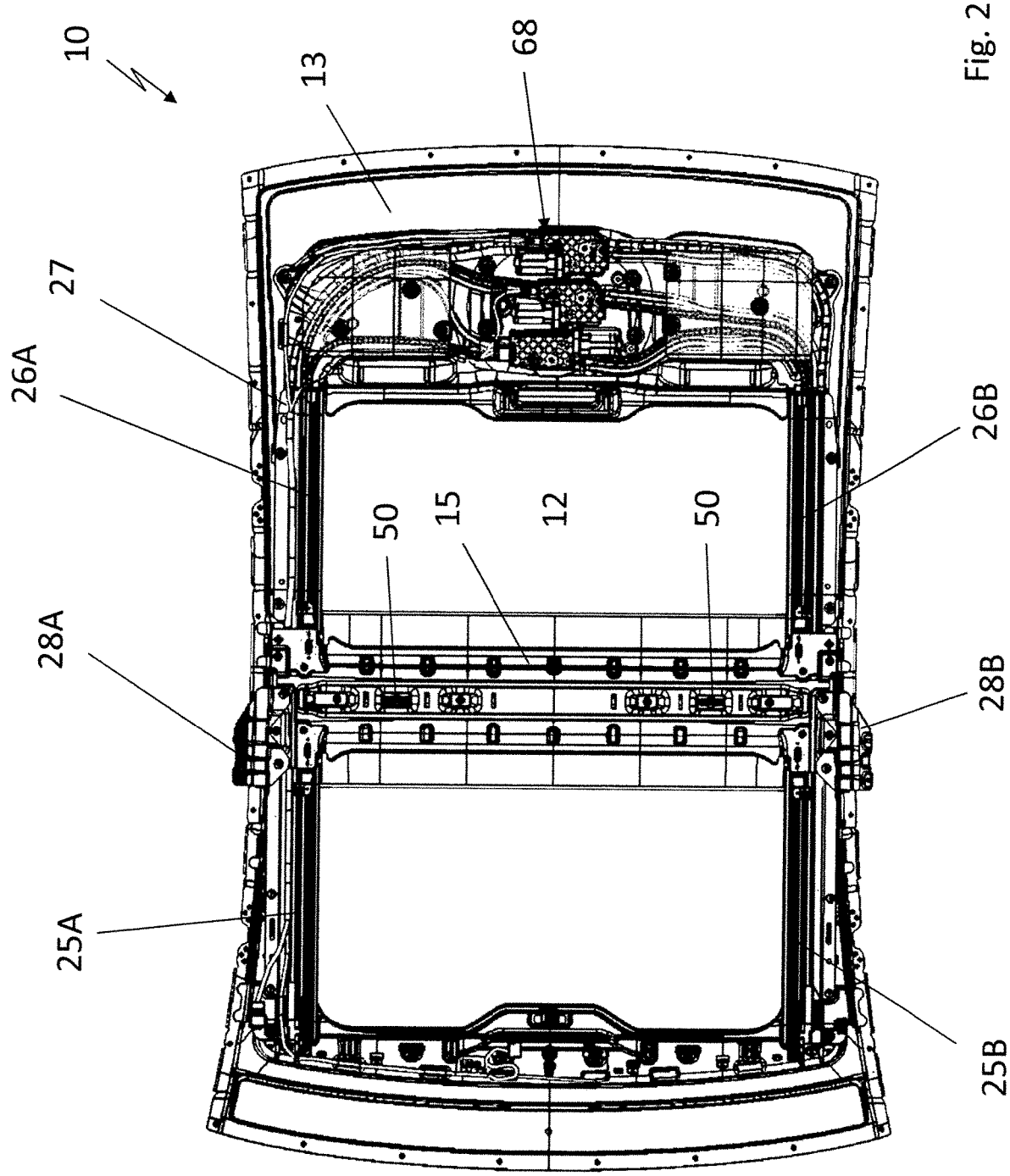
FIG. 2 shows a bottom view of the vehicle roof.
Figure 3:
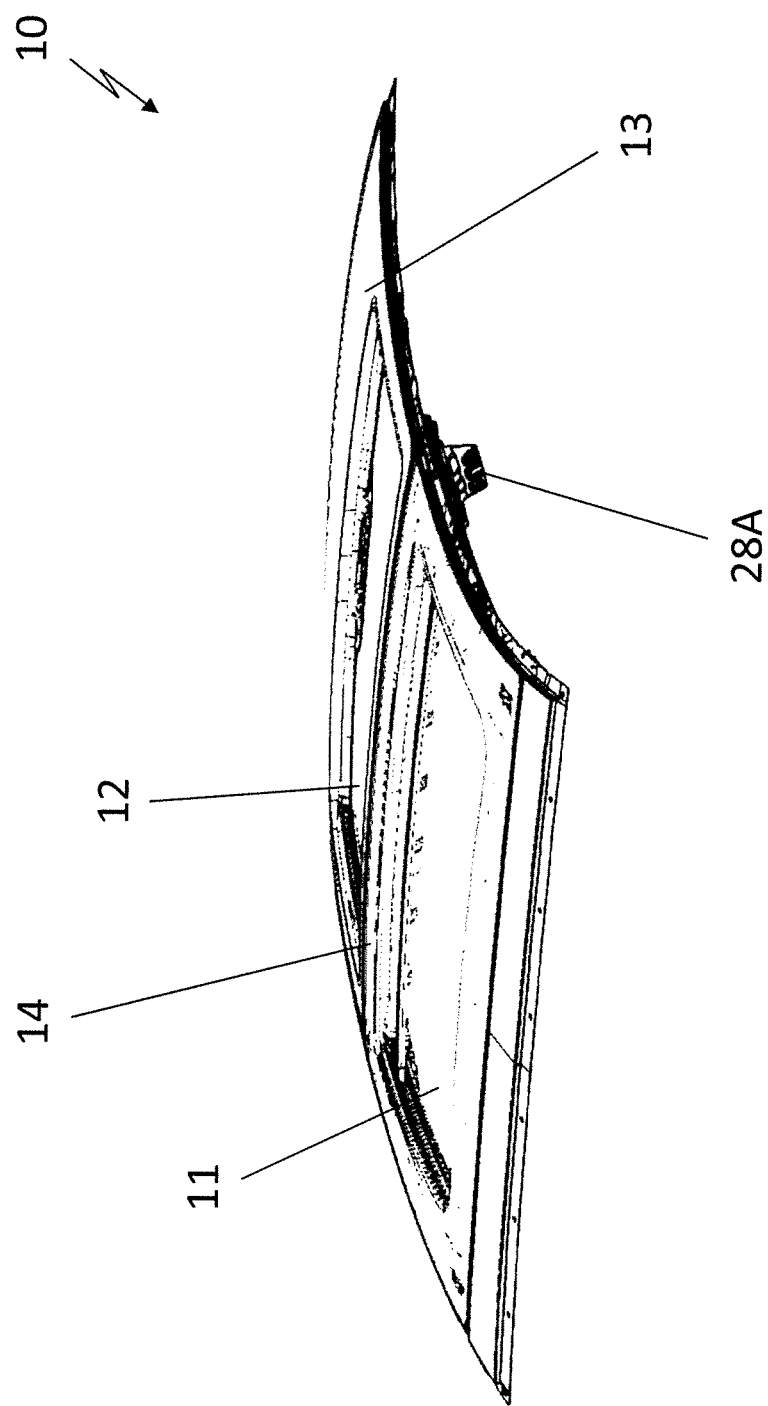
FIG. 3 shows a perspective top view of the vehicle roof.
Figure 4:
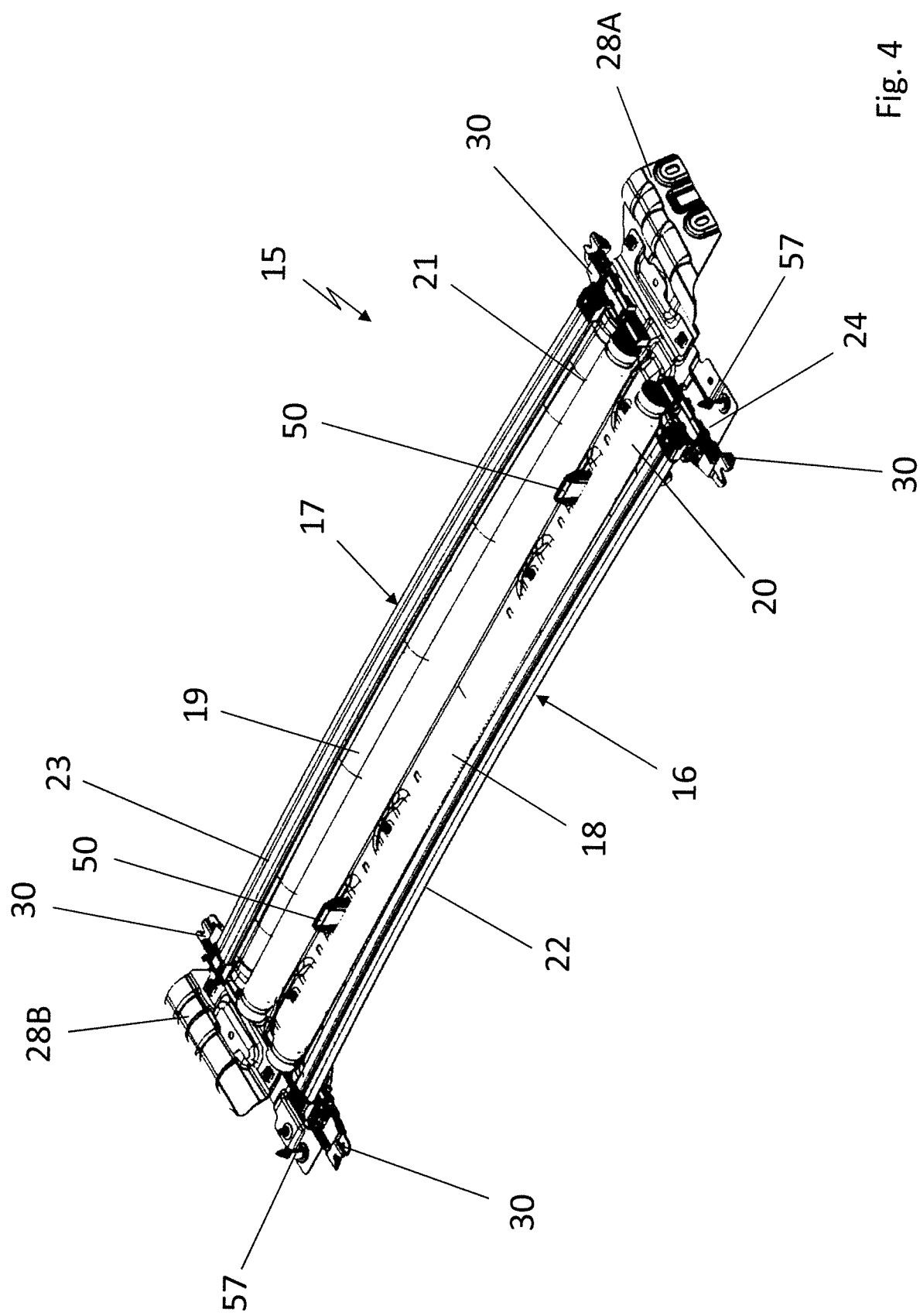
FIG. 4 shows a roller blind assembly of the vehicle roof in a perspective top view.
Figure 5:
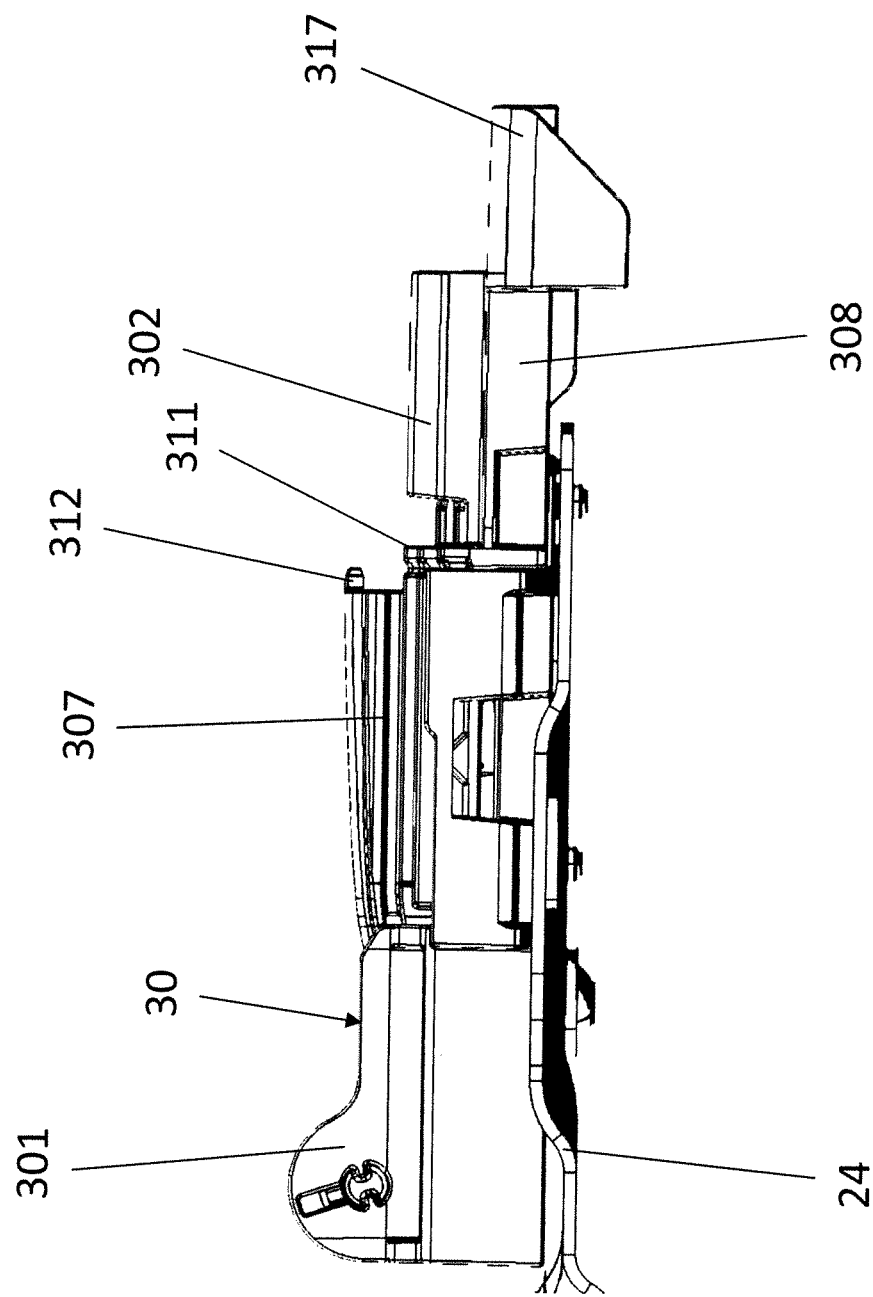
FIG. 5 shows a side view of a bearing shell of the roller blind assembly having a bearing unit for a roller blind web.
Figure 6:
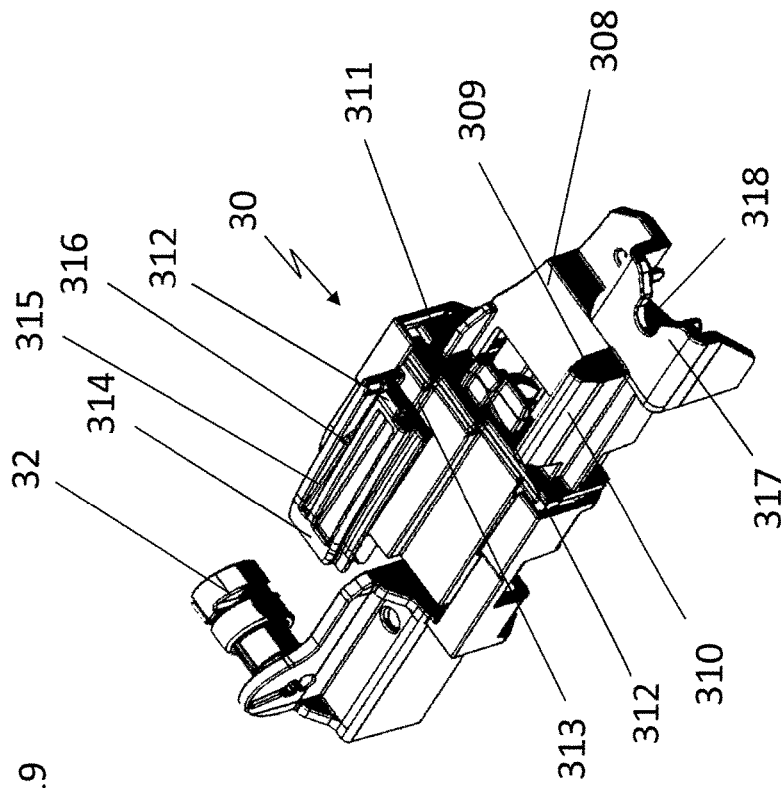
FIG. 6 shows a perspective top view of the bearing unit.
Figure 7:
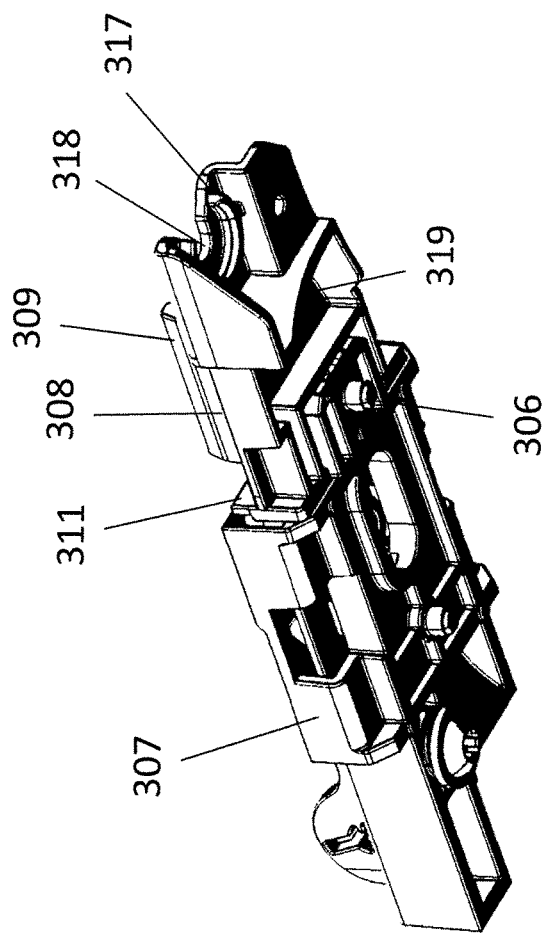
FIG. 7 shows a perspective bottom view of the bearing unit.
Figure 8:
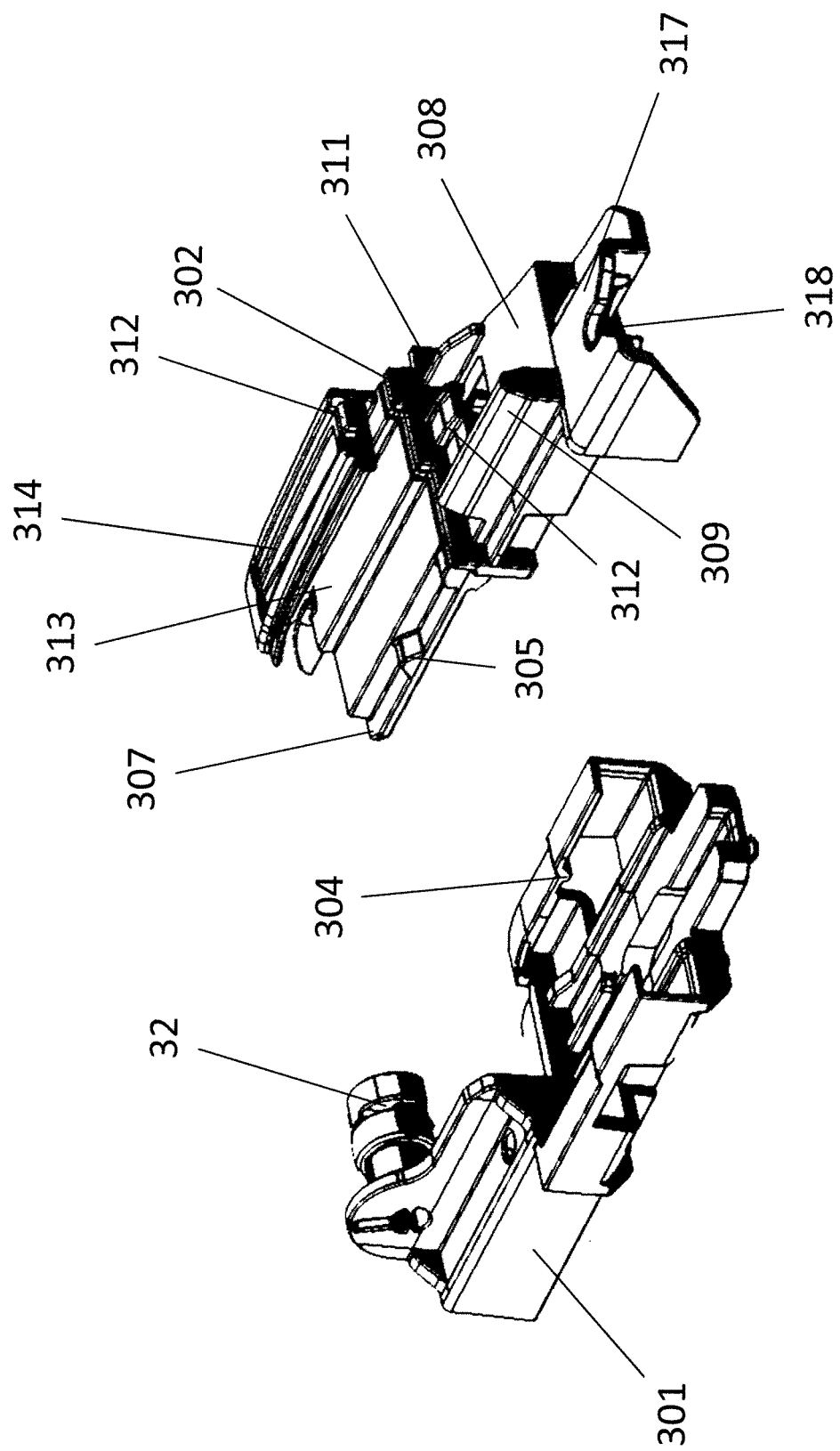
FIG. 8 shows an exploded illustration of the bearing unit.
Figure 9:
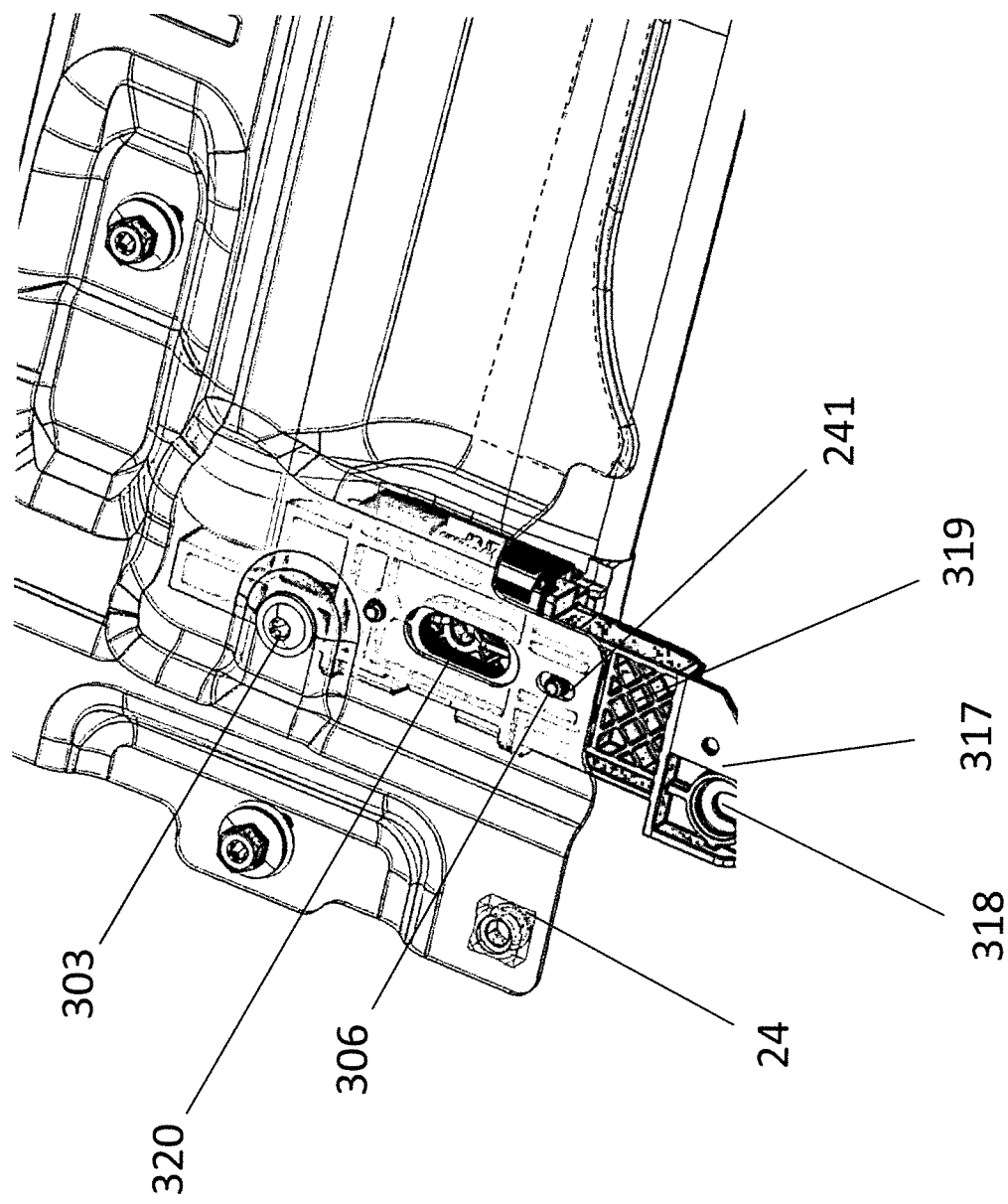
FIG. 9 shows a perspective bottom view of a part of the bearing shell having a bearing unit.
Figure 10:
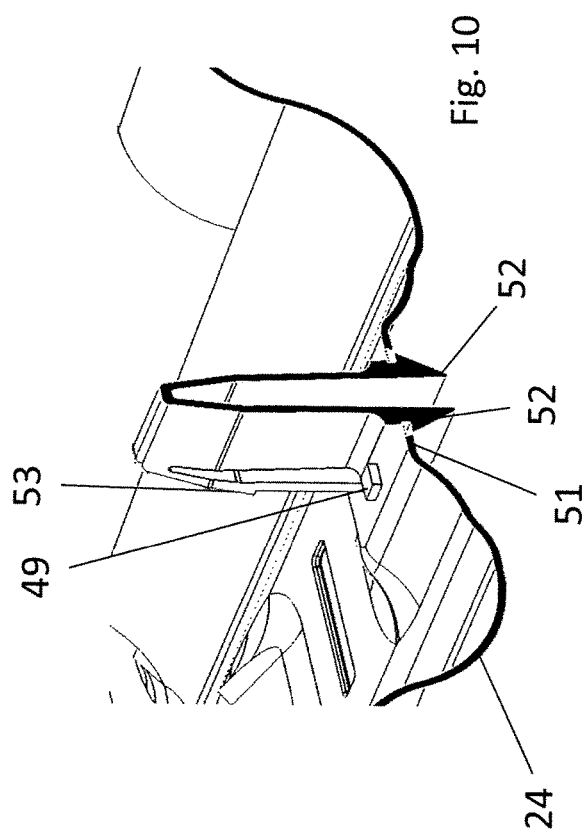
FIG. 10 shows a perspective illustration through the bearing shell and an installation clip.
Figure 11:
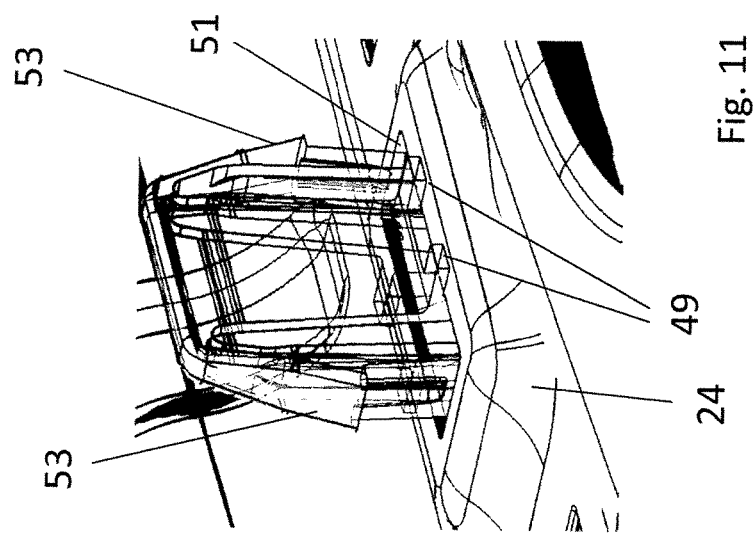
FIG. 11 shows a perspective top view onto the bearing shell in the area of the installation clip.
Figure 12:
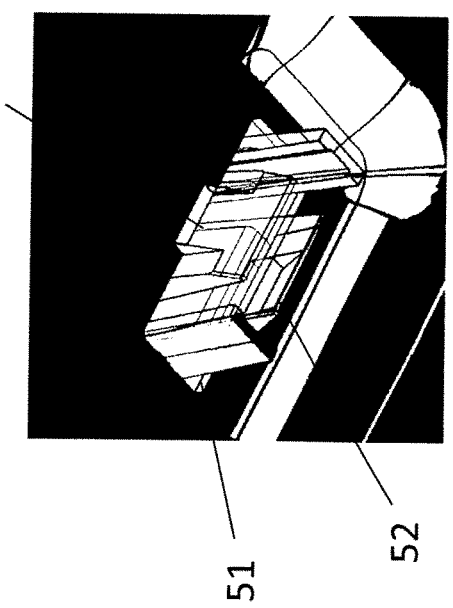
FIG. 12 shows a perspective bottom view of the bearing shell in the area of the installation clip.

Bearing units 30, one of which is illustrated in FIGS. 6 to 8 on its own, are each realized in two pieces and comprise a bearing pedestal 301 and a roller blind guide element 302. Bearing pedestal 301 is fastened to the upper side of bearing shell 24 with the aid of a fixing screw 303, which engages from below. Roller blind guide element 302 is inserted into bearing pedestal 301 from the front in relation to the direction in which the respective roller blind web is extended, in the manner of a drawer, and is secured at respective bearing pedestal 301 in a pre-installation position with the aid of catches 304 and 305.

For positioning bearing pedestal 301 minutely on bearing shell 24, bearing pedestal 301 includes a dowel 306 on its underside, said dowel engaging into a slot 241 of bearing shell 24.

Roller blind guide element 302, which is mounted in respective bearing pedestal 301 so as to be movable both in the vertical direction of the roof and the horizontal direction of the roof and in the longitudinal direction of the roof, includes a guide section 307 which is inserted into bearing pedestal 301 and a front centering section 308 with the aid of which the roller blind guide element 302 can be minutely positioned as against roof frame 27 or respective guide rail 25A, 25B, 26A or 26B.

Centering section 308, at its upper side, includes a centering rib 309 which constitutes a positioning projection and engages into a channel 34 of the respective guide rail from below as it can be taken from FIGS. 16a and 16b, said channel forming a holding fixture of the support section. In order to make it easier for centering rib 309 to enter channel 34, centering rib 309 has one flank on each of its two sides which is flared as a lead-in chamfer 310. Centering rib 309 makes it possible to position roller blind guide element 302 minutely as against respective guide rail 25A, 25B, 26A and 26B, respectively, in the cross direction of the roof.

Moreover, guide section 307 includes an end face 311 which rests against a face side of relevant guide rail 25A, 25B, 26A and 26B, respectively, in a flush way in the installation position. In order to achieve a minute positioning of roller blind guide element 302 in the vertical direction of the roof, roller blind guide element 302 furnishing a fabric centering, centering pins 312 are moreover realized in the area of end face 311, said centering pins 312 engaging into channels of respective guide rail profile 25A, 25B, 26A and 26B, respectively, said channels each forming a roof-attached centering clearance.

A guide track 313 is realized at guide section 307 of roller blind guide element 302, guide track 313 being aligned with a channel 35 of respective guide rail 25A, 25B, 26A and 26B, respectively, and a respective lateral guide tape of respective roller blind web 18 and 19, respectively, being guided in guide track 313. Guide track 313 is limited by a crosspiece 314 at whose upper side a groove 315 is realized which is interrupted by a catch 316 with the aid of which a pull bar slider 33 can be secured at roller blind guide element 302 of respective bearing unit 30 in a pre-installation state.

Roller blind guide elements 302 of bearing units 30 moreover include a fixing tab 317 at their front ends facing away from respective bearing pedestal 301, fixing tab 317 being provided with a screw hole 318 which is open at the side disposed in the direction in which respective roller blind web 18 and 19, respectively, i.e. at the face side of respective roller blind guide element 302 and respective roller blind guide element 302 being screwed to a respective guide rail 25A, 25B, 26A and 26B, respectively, via screw hole 318 with the aid of a fixing screw 36 (cf. FIG. 17).

Additionally, each of roller blind guide elements 302 includes a grasping recess 319 at its underside.

As it can in particular be taken from FIGS. 17a and 17b, roller blind guide elements 302 protrude beyond an edge of bearing shell 24 in the direction in which roller blind web 18 and 19, respectively, in question is extended so that workmen can take hold of grasping recess 319 from below so that they can move roller blind guide elements 302 as against bearing pedestals 301 in the direction of fixing screws 36 in such a way that screw holes 318 reach around fixing screws 36 in the manner of a fork and that end faces 311 abut against the corresponding face sides of guide rails 25A, 25B, 26A and 26B, respectively, in question. Centering pins 312 then engage into corresponding channels of the guide rails.

Each of roller blind units 16 and 17 is driven with the aid of a drive motor of a drive motor unit 68 which is disposed below a rear area of opaque solid roof section 13 and drives drive cables 39 which are coupled to a respective pull bar slider 33 via a coupling element 70 in each instance.

Figure 14:
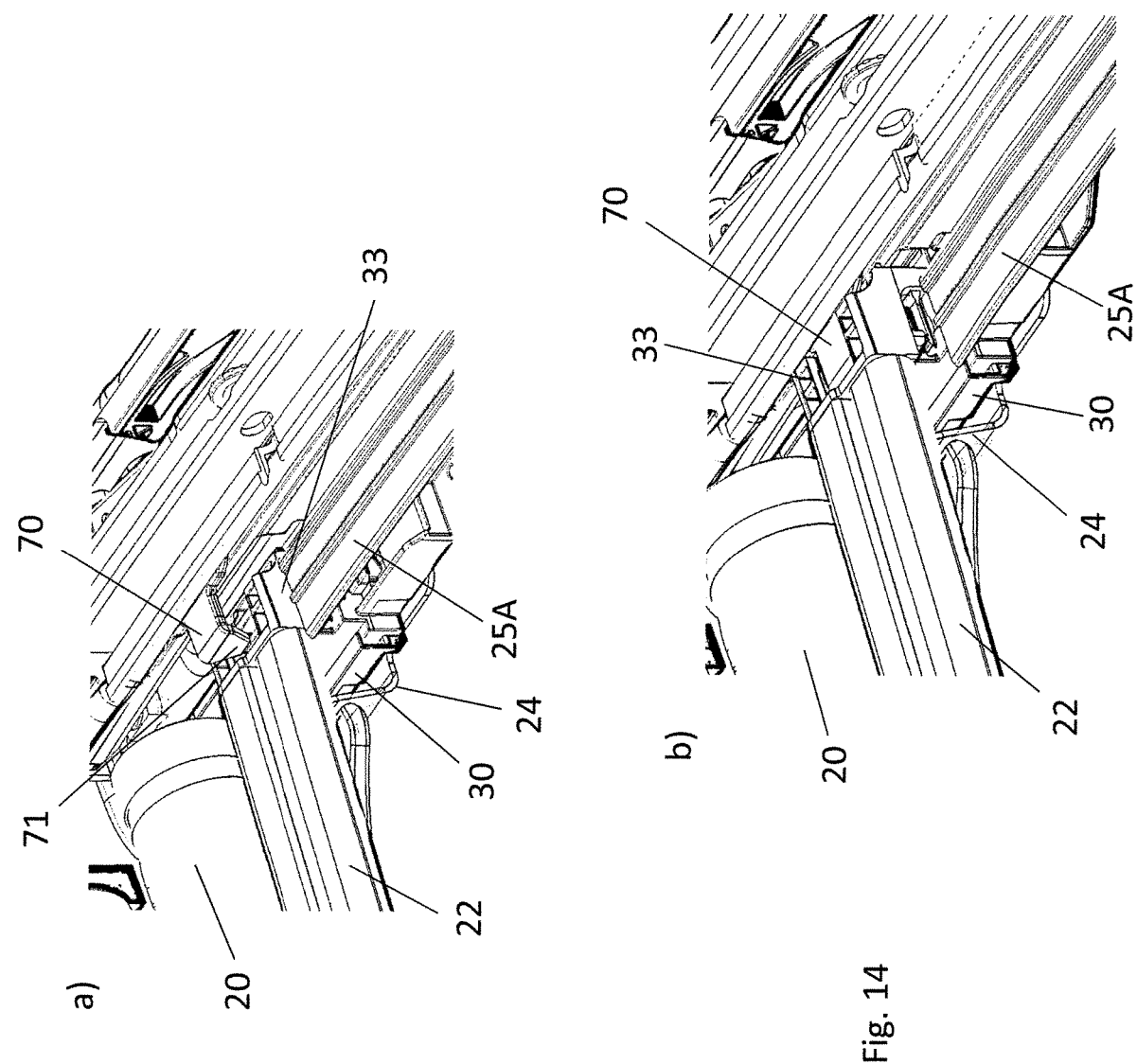

As it can in particular be taken from FIGS. 14 and 15, coupling elements 70 of drive cables 39 are realized so as to have a clamp-shaped cross section so that each of them includes a tongue 71 which is oriented so as to be parallel to the vertical longitudinal center plane of the roof and engages into a holding fixture 72 which is realized in respective pull bar slider 33.

As it can also be taken from FIGS. 14 and 15, tongue 71 enters holding fixture 72 of pull bar slider 33 when module-like roller blind assembly 15 is moved up to roof frame 27 from above. In order to be able to compensate for tolerances with respect to the positioning, tongue 71 includes flanks 73 which are realized as lead-in chamfers and which cooperate with lead-in chamfers 74 and 75 of holding fixture 72 of pull bar slider 33 in such a way that tongue 70 is guided into the same in a positionally accurate fashion and without play.

Bearing shell 24 of roller blind assembly 15 is provided with two installation clips 50 in the area between the two roller blind units 16 and 17, installation clips 50 being locked in a rectangular clearance 51 of bearing shell 24 in each instance and having a substantially rectangular cross section, as it can be taken from FIGS. 10 to 13. At their underside, each of installation clips 50 has first catch tabs 52 which reach behind bearing shell 24. In order to keep installation clips 50 in position at the bearing shell, stops 53 which protrude in the horizontal direction and rest against the upper side of bearing shell 24 are realized. Additionally, installation clips 50 include second catch tabs 53 at their flanks on both sides, said second catch tabs being offset by 90° as against first catch tabs 52 and installation clips 50 being able to be locked at roof frame 27 in a pre-installation position (cf. FIG. 13b) from below. Here, installation clips 50, which thus include four catch tabs each, reach through an installation clearance 54 of roof frame 27 in each instance. In this pre-installation position, fixing screws 55 engage into screw threads 56 with their free face sides, screw threads 56 being realized at roof frame 27 for fixing roller blind assembly 15.

Moreover, centering dowels 57 are disposed at bearing shell 24 at the upper side, centering dowels 57 pointing in the vertical direction of the roof and engaging into corresponding centering clearances of roof frame 27 in the pre-installation position illustrated in FIG. 13b and also in their final position.

As it can be taken from FIG. 18, each of pull bar sliders 33 includes a joining tab 60 for the guide tape of roller blind web 18 and 19, respectively, in question, apart from holding fixture 72 for coupling element 70 in question, as well as one sliding rail 61 at their lower lateral edges, sliding rail 61 making it possible that pull bar sliders 33 drive over the juncture between respective guide rail 25A, 25B, 26A and 26B, respectively, and respective roller blind guide element 302 in an noise-optimized way during regular operation of roller blind assembly 15 when respective roller blind web 18 and 19, respectively, is opened or wound up. Thus, it is guaranteed that a maximum surface of respective roof section 11 and 12, respectively, can be cleared for seeing through it. Additionally, pull bar sliders 33 each include a spring element 62 which retains them in respective guide rail 25A, 25B, 26A and 26B, respectively, under tension.

Above-described roller blind assembly 15 is installed in the following manner.

In a first installation step, roller blind assembly 15 is assembled, i.e. bearing shell 24 is provided with roller blind units 16 and 17, bearing pedestals 301 of bearing units 30 being screwed to bearing shell 24 via fixing screws 303. Additionally, fixing plates 28A and 28B are fastened. Moreover, installation clips 50 are inserted into clearances 51 and centering dowels 57 are screwed together with the aid of screws which engage from below. Roller blind assembly 15, which is procured in this way, is then, from below, moved up to solid roof section 14 which extends in the horizontal direction of the roof, installation clips 50 being locked in installation clearances 54 of roof frame 27 and centering dowels entering corresponding centering clearances of roof frame 27. Subsequently, fixing screws 55 are tightened whereby bearing shell 24 is pulled against roof frame 27. Tongues 71 of coupling elements 70, which have been moved into an installation position, simultaneously enter holding fixtures 72 of pull bar sliders 33. Additionally, centering ribs 309 of roller blind guide elements 302 of bearing units 30 enter channels 34 of guide rails 25A, 25B, 26A and 26B, whereby roller blind guide elements 302 are positioned or centered in the horizontal direction of the roof (cf. FIGS. 16a and b).

In a subsequent installation step, roller blind guide elements 302 are moved in the longitudinal direction of the guide rails as against bearing pedestals 301 and bearing shell 24 until end faces 311 abut against the face sides of the guide rails and screw holes 318 reach around fixing screws 36, for example by manually taking hold of roller blind guide elements 302 in the area of grasping recesses 319 or by an installation spike engaging into a hole 320 at the underside of respective roller blind guide element 302. Screws 36 are subsequently tightened.

Thus, roller blind guide elements 302 are positioned minutely as against roof frame 27. Roller blind assembly 15 can now be put into operation.

The invention claimed is:

1. A vehicle roof, comprising:
   at least one transparent roof section,
   a roof-attached support section and a roller blind assembly for selectively shading or clearing the transparent roof section at least partially,
   said roller blind assembly including at least one roller blind unit which comprises a roller blind web which can be wound up to form a roller blind reel and one lateral bearing unit on either side of a vertical longitudinal center plane of the roof, said roller blind reel being disposed between the two lateral bearing units and said roller blind assembly comprising a bearing shell on top of which the at least one roller blind unit is fastened via the lateral bearing units and which is fixed to the at least one support section from below,
   wherein each of the bearing units comprises a bearing pedestal which is fixed to the bearing shell and a roller blind guide element which can be displaced as against the bearing pedestal when in a pre-installation position and is fixed to the roof-attached support section when in an installation position.

2. The vehicle roof according to claim 1, wherein the roller blind guide elements in each instance protrude beyond an edge of the bearing shell in the direction in which the roller blind web is extended.

3. The vehicle roof according to claim 1, wherein each of the roller blind guide elements includes a screw hole which is open at a side disposed in the direction in which the roller blind web is extended and via which the respective roller blind guide element is screwed to the roof-attached support section.

4. The vehicle roof according to claim 1, wherein each of the roller blind guide elements includes a grasping recess at its underside.

5. The vehicle roof according to claim 1, wherein each of the roller blind guide elements includes a centering track in which a lateral guide tape of the roller blind web is guided and which is aligned with a channel of a guide rail profile which is part of the support section.

6. The vehicle roof according to claim 1, wherein each of the roller blind guide elements has a guide track for a pull bar slider, said guide track being aligned with a guide channel of a guide rail profile which is part of the support section.

7. The vehicle roof according to claim 6, wherein each of the roller blind guide elements includes a catch which retains the respective pull bar slider in a pre-installation state at the respective roller blind guide element.

8. The vehicle roof according to claim 1, wherein each of the roller blind guide elements is mounted in the respective bearing pedestal with play in at least two directions in space.

9. The vehicle roof according to claim 1, wherein the roller blind guide elements in a pre-installation state, are secured in the respective bearing pedestal with the aid of a catch.

10. The vehicle roof according to claim 1, wherein each of the roller blind guide elements includes a positioning projection which engages into a corresponding holding fixture of the support section from below and which is in particular realized as a centering rib which extends in the direction in which the roller blind web is extended.

11. The vehicle roof according to claim 1, wherein each of the roller blind guide elements comprises at least one centering pin disposed at the face side and engaging into a roof-attached centering clearance.

12. The vehicle roof according to claim 11, wherein the centering clearance is formed by a guide rail profile with which a face side of the respective roller blind guide element is in contact when in an installation position.

13. The vehicle roof according to claim 1, wherein pull bar sliders are provided, each of which includes a holding fixture for a coupling element of a respective drive cable which is driven by a drive motor.

14. The vehicle roof according to claim 13, wherein the holding fixture is open to the top and receives the coupling element without play in the longitudinal direction of the respective guide rail profile.

15. The vehicle roof according to claim 13, wherein each of the holding fixtures has lead-in chamfers for the respective coupling element.

16. The vehicle roof according to claim 13, wherein each of the coupling elements of the drive cables has a clamp-shaped cross section and comprises a tongue which is oriented so as to be parallel to the vertical longitudinal center plane of the roof.

17. The vehicle roof according to claim 1, wherein each of the bearing pedestals comprises a bearing pin for a winding tube.

18. The vehicle roof according to claim 1, wherein the bearing shell is provided with at least one installation clip which retains said bearing shell at the support section in a pre-installation position and which preferably has a rectangular cross-section.

19. The vehicle roof according to claim 18, wherein the installation clip is locked in a clearance of the bearing shell.

20. The vehicle roof according to claim 18, wherein the installation clip, in the pre-installation position, is locked in an installation clearance of the support section from below with play in the vertical direction of the roof.

21. The vehicle roof according to claim 1, wherein the bearing shell comprises a centering dowel which engages into a centering clearance of the roof-attached support section from below.

22. The vehicle roof according to claim 1, wherein the bearing shell is provided with a fixing plate on either side of the vertical longitudinal center plane of the roof, being fixable to the body via said fixing plate.

23. The vehicle roof according to claim 1, wherein the support section is formed by a frame of a roof opening system.

24. The vehicle roof according to claim 1, wherein the roller blind assembly comprises two roller blind units which are disposed on the bearing shell.

* * * * *